(12) United States Patent
Autran

(10) Patent No.: US 9,189,111 B2
(45) Date of Patent: Nov. 17, 2015

(54) MAN-MACHINE INTERFACE WITH SMOOTH UPPER SURFACE

(75) Inventor: Frédéric Autran, Paris (FR)

(73) Assignee: Valeo Systemes Thermiques, Le Mesnil-Saint-Denis (FR)

( * ) Notice: Subject to any disclaimer, the term of this patent is extended or adjusted under 35 U.S.C. 154(b) by 51 days.

(21) Appl. No.: 13/638,164

(22) PCT Filed: Mar. 30, 2011

(86) PCT No.: PCT/FR2011/000187
§ 371 (c)(1),
(2), (4) Date: Mar. 7, 2013

(87) PCT Pub. No.: WO2011/124783
PCT Pub. Date: Oct. 13, 2011

(65) Prior Publication Data
US 2013/0155008 A1    Jun. 20, 2013

(30) Foreign Application Priority Data
Mar. 31, 2010    (FR) ...................................... 10 01313

(51) Int. Cl.
*G06F 3/045*    (2006.01)
*G06F 3/044*    (2006.01)
*G06F 3/0354*    (2013.01)
*G06F 3/041*    (2006.01)

(52) U.S. Cl.
CPC ............ *G06F 3/044* (2013.01); *G06F 3/03547* (2013.01); *G06F 3/041* (2013.01)

(58) Field of Classification Search
CPC ...... G06F 3/041; G06F 3/044; G06F 3/03547
USPC .............. 345/8, 156–184, 501; 359/268, 601, 359/831, 834; 701/2, 3, 22, 33, 209; 349/12
See application file for complete search history.

(56) References Cited

U.S. PATENT DOCUMENTS

| | | | |
|---|---|---|---|
| 4,766,023 A * | 8/1988 | Lu ................................... | 428/120 |
| 6,917,391 B1 * | 7/2005 | Faris ................................ | 349/12 |
| 8,394,463 B1 * | 3/2013 | Chiu et al. ..................... | 427/487 |
| 2003/0043353 A1 * | 3/2003 | Oka et al. ......................... | 355/40 |
| 2003/0210484 A1 * | 11/2003 | Otake et al. .................... | 359/881 |
| 2004/0182979 A1 * | 9/2004 | Krzoska et al. ............. | 248/316.8 |
| 2005/0024754 A1 * | 2/2005 | Epstein et al. ................. | 359/831 |
| 2006/0007180 A1 * | 1/2006 | Tremaine et al. ............. | 345/173 |
| 2006/0144934 A1 | 7/2006 | Fletcher et al. | |
| 2008/0065322 A1 * | 3/2008 | Ng et al. ........................ | 701/209 |
| 2008/0094372 A1 | 4/2008 | Philipp | |
| 2008/0211779 A1 * | 9/2008 | Pryor ............................. | 345/173 |
| 2008/0215192 A1 * | 9/2008 | Hardman et al. .................. | 701/3 |
| 2008/0259053 A1 * | 10/2008 | Newton ......................... | 345/175 |
| 2008/0284719 A1 * | 11/2008 | Yoshida ......................... | 345/102 |
| 2009/0009455 A1 * | 1/2009 | Kimura ............................ | 345/89 |

(Continued)

OTHER PUBLICATIONS

International Search Report w/translation from PCT/FR2011/000187 mailed on Aug. 22, 2011 (4 pages).

*Primary Examiner* — Prabodh M Dharia
(74) *Attorney, Agent, or Firm* — Osha Liang LLP

(57) ABSTRACT

A human-machine interface provided with a viewing device arranged facing a frame is disclosed. The top face of the viewing device is arranged substantially above the top face of the frame and the viewing device and the frame are covered by a smoothing film.

13 Claims, 3 Drawing Sheets

(56) References Cited

U.S. PATENT DOCUMENTS

| | | | |
|---|---|---|---|
| 2009/0075624 A1* | 3/2009 | Cox et al. | 455/345 |
| 2009/0115733 A1* | 5/2009 | Ma et al. | 345/173 |
| 2009/0295755 A1* | 12/2009 | Chapman et al. | 345/175 |
| 2010/0001951 A1* | 1/2010 | Yen et al. | 345/157 |
| 2010/0017119 A1* | 1/2010 | Diaz et al. | 701/209 |
| 2010/0039355 A1* | 2/2010 | Park | 345/76 |
| 2010/0123675 A1* | 5/2010 | Ippel | 345/173 |
| 2010/0164836 A1* | 7/2010 | Liberatore | 345/1.1 |
| 2010/0165271 A1* | 7/2010 | Tsubata | 349/106 |
| 2010/0253602 A1* | 10/2010 | Szczerba et al. | 345/8 |
| 2010/0316316 A1* | 12/2010 | Kamel | 384/448 |
| 2011/0037725 A1* | 2/2011 | Pryor | 345/174 |
| 2011/0062849 A1* | 3/2011 | Carlson et al. | 313/110 |
| 2011/0096388 A1* | 4/2011 | Agrawal et al. | 359/268 |
| 2011/0144857 A1* | 6/2011 | Wingrove et al. | 701/33 |
| 2011/0148805 A1* | 6/2011 | Lee | 345/174 |
| 2011/0267298 A1* | 11/2011 | Erhart et al. | 345/173 |
| 2012/0038570 A1* | 2/2012 | Delaporte | 345/173 |
| 2012/0106092 A1* | 5/2012 | Chen | 361/728 |
| 2012/0134025 A1* | 5/2012 | Hart | 359/601 |
| 2012/0242635 A1* | 9/2012 | Erhart et al. | 345/207 |
| 2012/0268665 A1* | 10/2012 | Yetukuri et al. | 348/837 |
| 2013/0041235 A1* | 2/2013 | Rogers et al. | 600/306 |
| 2013/0194425 A1* | 8/2013 | Schofield et al. | 348/148 |
| 2013/0238165 A1* | 9/2013 | Garrett et al. | 701/2 |
| 2013/0318470 A1* | 11/2013 | Kao et al. | 715/781 |
| 2014/0210588 A1* | 7/2014 | Ellis et al. | 340/4.4 |
| 2014/0282263 A1* | 9/2014 | Pennington et al. | 715/838 |
| 2014/0375530 A1* | 12/2014 | Delaporte | 345/1.3 |

\* cited by examiner

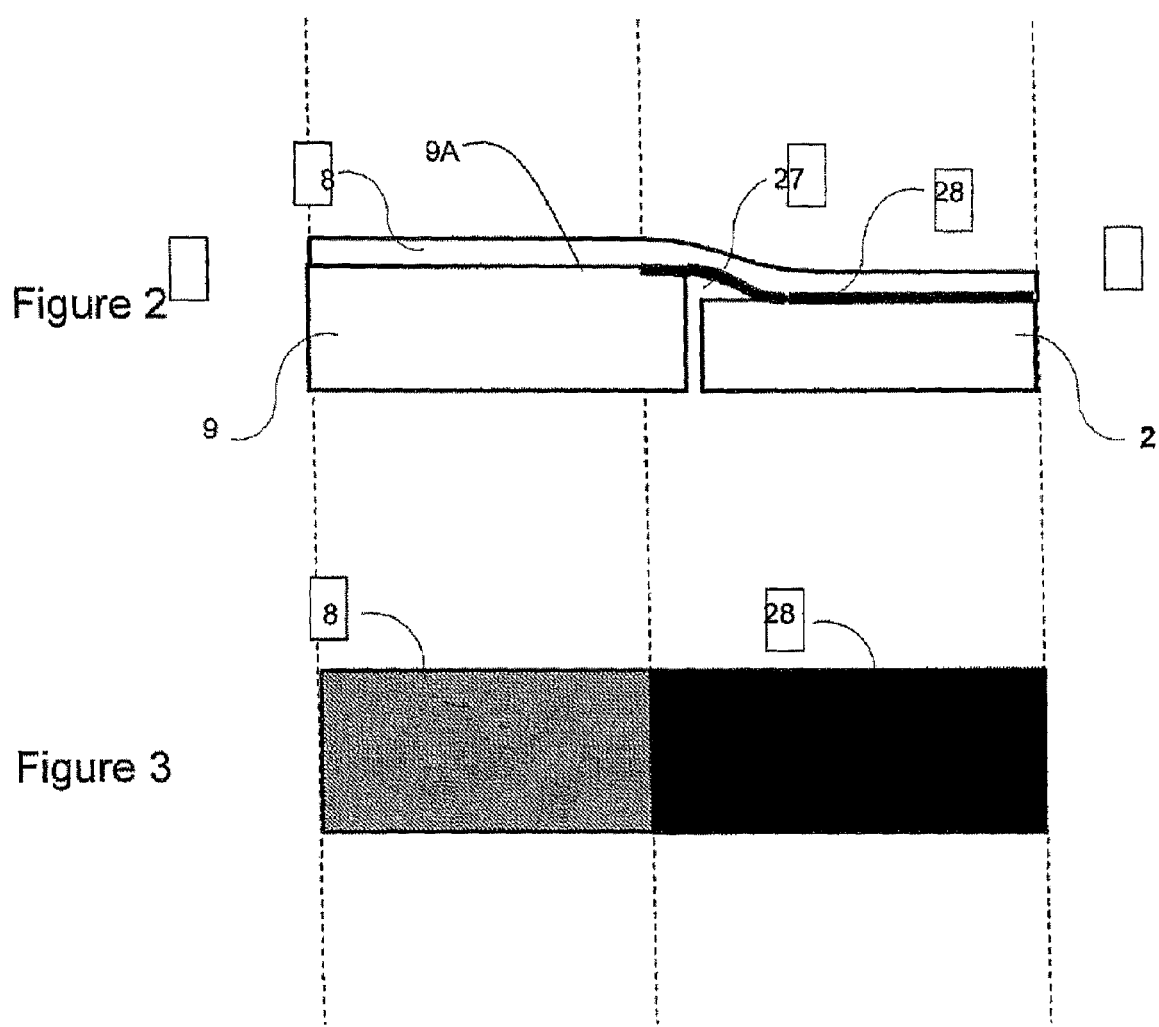

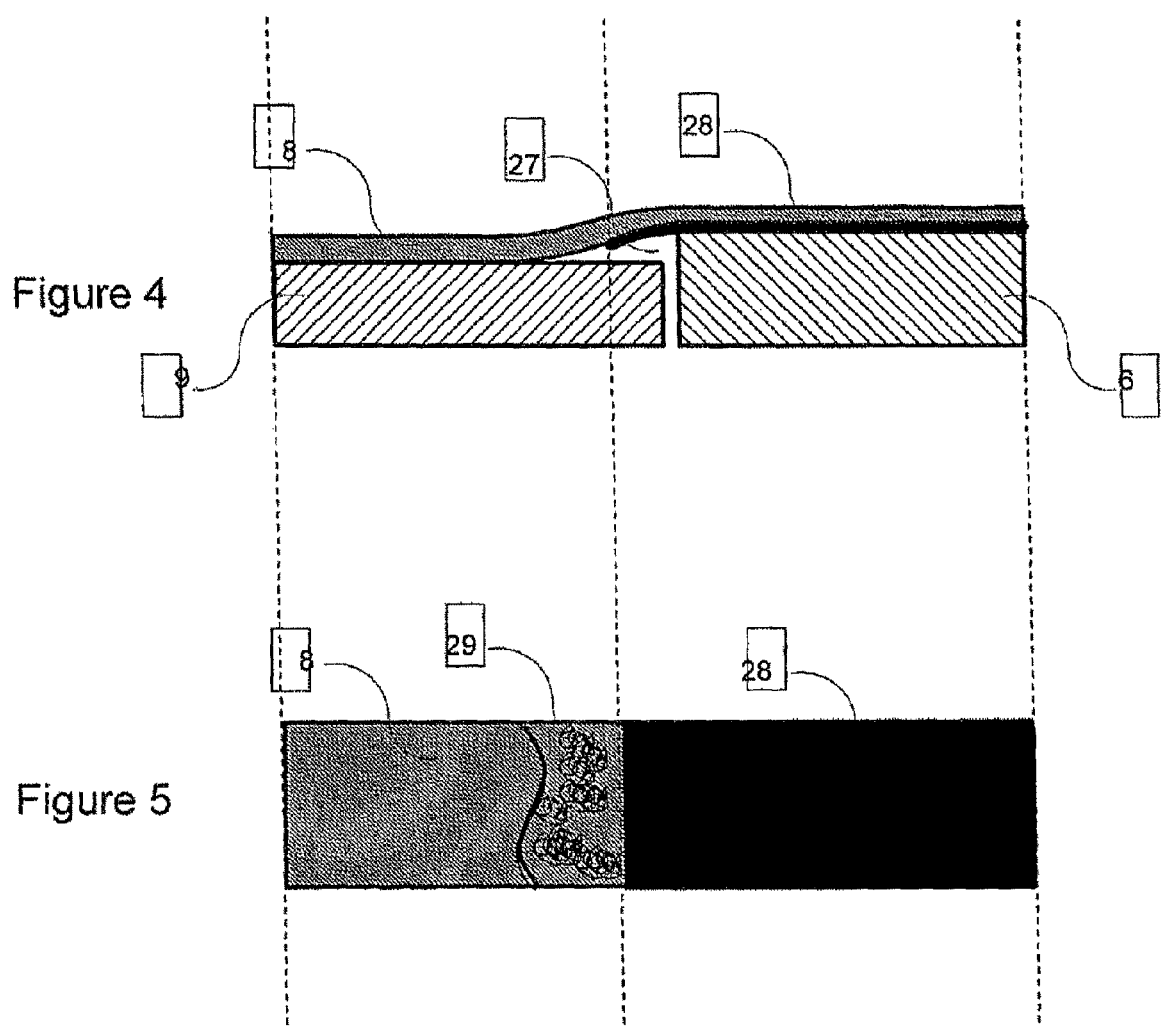

MAN-MACHINE INTERFACE WITH SMOOTH UPPER SURFACE

The present invention relations to a human-machine interface provided with a viewing device arranged facing a frame. Such an interface is commonly used in many business sectors involving the touch control of equipment, for example in the field of home automation or in the manipulation of computer tools. The invention targets more particularly, although not exclusively, the use of such an interface for the control of the various systems (navigation, audio or multimedia, air conditioning) of a motor vehicle, the interface then being able to be incorporated in the passenger compartment of the vehicle and the viewing device being a touch interaction device.

A human-machine interface for the touch control of equipment generally comprises a touch interaction device comprising a touch sensor that is at least partially transparent provided with two non-parallel networks of conductive tracks, spaced apart by insulating spacers so that, when a user presses on the sensor, certain tracks of these two networks come into contact, so that, when an electrical signal is emitted from the end of a track of one of the networks, this signal can be detected by the end of a track of the other network and the existence of a contact at the intersection of these two tracks is detected. This touch sensor is arranged above a display showing the plurality of graphical objects to be manipulated, this manipulation being managed by an electronic control circuit linking the touch sensor, the display, and the various equipment items to be controlled through a touch interaction device.

For the purposes of its incorporation in a passenger compartment or any other support, the interface comprises a frame, the opening of which is intended for the viewing by a user. For this, the touch interaction device is arranged facing the frame, with no particular consideration as to the position of the top face of the interaction device in relation to the top face of the frame, the latter generally being located above.

Now, the fact that the top face of the frame is situated above that of the interaction device presents the drawback of creating a surface discontinuity at the level of the top part of the human-machine interface, this part being the one oriented toward the user. This discontinuity gives this top part a non-smooth and non-uniform appearance, which is detrimental to the general aesthetics of the interface.

To overcome this drawback, the touch interaction device could be adjusted so that its top face is at the same level as the top face of the frame, the whole being covered with a film, the function of which is to smooth and make uniform the top part of the interface.

However, here again, aesthetic issues arise together with problems of disturbance of the image perceived by the user. This is because, at the time of manufacture of the interface, a positioning tolerance of the abovementioned two faces relative to one another may be observed, so that that of the interaction device may be situated below that of the frame. This discontinuity, even limited by a low positioning tolerance, results in the appearance of areas of air at the edges of the device. These areas, delimited above by the smoothing layer, below by the interaction device and on the side by the frame, may cause aesthetically unpleasing effects on the edges of said device because it is a transparent area, the area of air causing an inappropriate reflection as a result of the change of index of the light rays which thus makes said area of air apparent. The image visible to the user is degraded locally by spurious reflections or a blurring, which is reflected in all cases by a discontinuity.

The aim of the invention is to remedy these drawbacks and it relates to a human-machine interface provided with a viewing device, for example a screen or a touch interaction device, arranged facing a frame, the interaction device and the frame being arranged so that the top part of the interface presents an aesthetic appearance that is smooth, uniform and without visual defects.

To this end, according to the invention, the human-machine interface of the type defined above is noteworthy in that the top face of the viewing device, advantageously formed by the interaction device or a screen, is arranged substantially above the top face of the frame and in that said device and said frame are covered by a smoothing film.

The invention provides an assurance that the top face of the frame is arranged sufficiently under that of the device for it to remain so after integration of the different elements within the interface, that is to say by including the positioning tolerances of these two faces relative to one another. In this way, the above-mentioned areas of air are still present, but they are now delimited above by the smoothing layer, below by the frame and on the side by the interaction device. Thus, these areas of air are no longer located on the edges of the touch interaction device, where they give an aesthetically unpleasing appearance or form a visual nuisance, but on the edges of the frame, the appearance of which can be made opaque and where they can therefore be made invisible.

In other words, the present invention does not propose eliminating or even shrinking the areas considered to be an aesthetic nuisance, but on the contrary moving these areas to a place where they no longer create aesthetically unpleasing effects or blurring visible to the user with respect to the viewing, notably touch interaction, device.

According to a particular embodiment, the viewing device, in particular the touch interaction device, is covered with an adjustment layer for adjusting the position of the top face of said device in relation to the top face of the frame. Consequently, the top face of this adjustment layer is positioned according to the invention above that of the frame, the smoothing layer covering the device, the frame and said adjustment layer all at the same time.

Preferably, the frame is covered with a masking layer or the smoothing film comprises a masking layer, which makes it possible to mask the edge of the frame to which the areas which present an aesthetically unpleasing effect or blurring have been moved, and thus completely mask these areas of air.

In the latter case, advantageously, the masking layer also covers at least a part of the top face of the viewing device, in particular the touch interaction device, which offers a safety margin to ensure the coverage of the area of air that the invention to be moved above the frame.

In order to perfectly adjust the position of the top faces of the device and of the frame, provision is advantageously made for the distance between the top face of the viewing device, in particular the touch interaction device, and the top face of the frame:

not to exceed the thickness of the smoothing film, in order not to excessively deform said smoothing film, and/or to be greater than the positioning tolerance of said faces relative to one another, in order to ensure the positioning of said faces in accordance with the invention by taking into account the fact that the latter can be disturbed by the tolerance corresponding to the actual positioning of the device in relation to the frame.

Preferably, the viewing device, in particular the touch interaction device, comprises a touch sensor which is at least partially transparent arranged above a display.

In a preferred embodiment of the invention, the viewing device is a touch interaction device.

In a particularly advantageous embodiment, in which the interaction device has at least a part facing the bottom face of the frame, said part is fixed to said bottom face of said frame. The frame thus serves an additional purpose of support for the touch interaction device, said device being suspended from said frame, which makes any movement of the device in relation to the frame impossible and thus makes it possible to maintain a constant gap between them in all circumstances, although they even so have quite different expansion coefficients (in general, the device is mainly made of glass, the frame of plastic).

In a particular embodiment, in which the interaction device is incorporated in a case, this case comprises in its top part, a shoulder to support the frame.

Other features and advantages of the invention will become apparent from the following description given in light of the appended drawings, given as a nonlimiting example, in which:

FIG. 2 is a schematic view in cross section of the edges of the frame and of the touch interaction device incorporated in the interface of FIG. 1;

FIG. 3 is a schematic plan view of the interface of FIG. 1;

FIG. 4 is a schematic view in cross section of the edges of the frame and of the touch interaction device incorporated in a human-machine interface according to the prior art, for comparison purposes; and FIG. 5 is a schematic plan view of the interface of FIG. 4.

Figure 1:
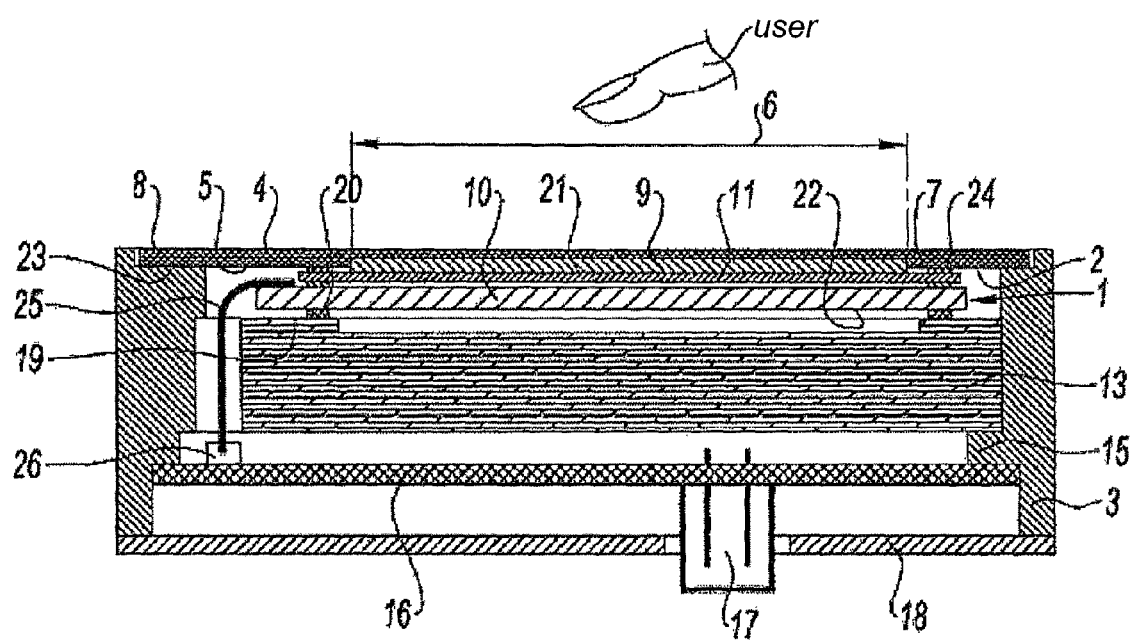
FIG. 1 is a schematic view in cross section of a human-machine interface according to one embodiment of the invention.

These appended figures will give a clear understanding of how the invention can be produced and may serve to better define the invention, if necessary.

For better legibility, identical references in these figures designate similar elements.

The human-machine interface of FIG. 1 comprises a case 3 having an internal void inside which the constitutent elements of the touch interaction interface are installed, in particular a viewing device, in particular a touch interaction device, which incorporates a touch sensor 1, a display 13 and an electronic control circuit 16.

The following description refers to a touch interaction device as a nonlimiting example of the viewing device, the latter also being able to be a display or a screen.

The display 13 is installed in the case 3 by pressing against a shoulder 15 formed in the void thereof. The technology employed for this display is, for example, of the backlit screen, LCD screen, plasma screen type, or generally of the multifunction screen type, that is to say a screen displaying a multiplicity of information such as navigation, audio management and/or thermal management (for the passenger compartment of the vehicle).

On the other side of the shoulder 15, there is installed a printed circuit or electronic card 16 on which is arranged an electrical connector 17 intended to connect the human-machine interface to the network of the motor vehicle. A cover 18 closes the rear part of the case 3, said cover 18 including a hole for the passage of the connector 17. It will be noted that this cover is arranged on the rear face of the human-machine interface, that is to say, the face giving access to the technical part of the interface. Opposite is the top part, oriented toward the user, that is to say the part which faces the user of the interface.

The display 13 is capped by the touch sensor 1. An air- and water-tight seal is formed between the display 13 and the touch sensor 1, more particularly the face 19 of the display 13 is oriented toward the user and the rear face of the touch sensor 1. This tight seal is produced by means of a seal 20 arranged peripherally on the face 19.

The touch sensor 1 can be of resistive or capacitive type, the invention finding a quite particular application with in the case of a resistive sensor. This sensor is made up of a main plate 10 and a secondary plate 11. These two plates are made of glass, the secondary plate being thinner than the main plate 10. The secondary plate 11 acts as contact surface capable of being deformed under the effect of a pressing force exerted by the finger of the user, whereas the main plate 10 is less deformable and acts as support.

The sensor is thus able to detect the position of the finger of the user by virtue of a network of conductors placed between the main plate and the secondary plate, in an arrangement that is, for example, horizontal and vertical. The touch sensor 1 is linked electrically to the electronic board 16 by means of a multicore flexible cable 25, the latter being connected to the electronic board by a removable electrical coupling 26. In this way, the touch sensor 1 has a face 21 sensitive to any contact, oriented toward the user, and a rear face 22, facing the display 13.

The touch sensor 1 is fixed to a frame 2, which acts as support for the touch interaction device, and which takes the form of a flat and rigid element, with a thickness of between 0.20 and 0.50 mm. This element is a thin metal plate, for example made of stainless steel.

The frame 2 has two large faces called top face 4 and bottom face 5. The top face 4 is the one which faces the user and which is accessible to the touch thereof. The bottom face 5 is a face substantially parallel to the sensitive face 21 of the touch sensor 1, this bottom face 5 facing toward said touch sensor 1. Generally, the top face 4 is the one which faces the passenger compartment of the vehicle whereas the bottom face 5 is the one which faces the interior of the dashboard.

The case 3 comprises a shoulder 23 which receives the frame 2. This shoulder 23 delimits a cavity whose length and width are substantially equal to the length and the width of the frame 2.

The touch sensor 1 is fixed onto the bottom face 5 of the frame 2. This fixing can be provided by any type of means suitable for securing two parts together. Advantageously, a bead or spots of glue 24 ensure the mechanical bond between the sensitive face 21 of the touch sensor and the bottom face 5 of the frame. Alternatively, the spots of glue 24 may be replaced or complemented by an adhesive strip.

The frame 2 has an opening 6 delimited by an edge 7. When this opening 6 is formed in the central part of the frame 2, the edge 7 surrounds the opening 6 peripherally. This edge 7 covers the peripheral edge of the touch sensor 1.

In this embodiment, the space created by the opening 6 at the level of the touch sensor 1 is filled with an adjustment layer 9—or even a fill-in layer—arranged so as to define, together with the edge 7 and the top face of the frame 2, a planar and smooth surface. This adjustment layer 9 comprises a transparent and flexible film manufactured from a strip of polycarbonate or polyethylene terephthalate (PET).

A smoothing film 8 is arranged on the top face 4 of the frame 2 so as to cover the opening 6 and the edge 7. Since this film extends over the entire surface of the frame 2, it will be understood that the dimensions of the film 8 and the dimensions of the frame 2 are substantially equal. Since this film covers the opening 6, it bears on the adjustment layer 9 thus forming a surface that is totally smooth and uniform to the touch for the user.

In this embodiment, the depth of the shoulder 23 is at least equal to the sum of the thicknesses of the film 8 and of the frame 2 and advantageously slightly greater (depth=sum of the thicknesses of the film 8 and of the frame 2 plus 0.2 mm) to guarantee that the sliver of the film is protected against the risks of tearing.

The film 8 is a transparent film which can exhibit a single property or a combination of properties, including:
- decorative properties, which makes it easy to define a particular form visible to the user;
- anti-scratch properties, so as to avoid the appearance of any scratches on the surface of the human-machine interface;
- anti-reflection properties;
- diffusion properties in order to give a matt appearance to the human-machine interface and avoid the nuisance mirror effects for the user; and
- polarizing properties.

There now follows a description of the arrangement, according to the invention, of the top face of the adjustment layer 9 (forming part of the touch interaction device) in relation to the top face of the frame 2, with reference to FIGS. 2 and 3.

In the present case, the touch interaction device is provided with an adjustment layer 9 and suspended (via the touch sensor 1) from the frame 2, but the person skilled in the art will be able to adapt this variant to the case where the device is fixed in another manner to the case and to the case where no adjustment layer is used, that is to say in the case where the top part of the device is made up of the viewing device or of the touch interaction device, that is to say the touch sensor 1. This adjustment layer 9 is arranged so that, after integration (therefore including the positioning tolerances), its top face is situated above that of the frame 2. Moreover, the edge of the frame 2 and the layer 9 are not glued to one another, so that a space can be observed between them. The assembly is coated with a smoothing film 8 so as to smooth the discontinuities of the top part of the interface and thus render said part smooth and uniform.

FIG. 2 then shows an area of air 27, delimited above by the smoothing film 8, on the side by the adjustment layer 9 and below by the frame 2. This area of air 27 is not therefore located on the adjustment layer 9 (which is vertically above the touch sensor 1 and the display 13, and forms the top part of the touch interaction device) but on the frame 2, where the aesthetically unpleasing effect or the visual disturbances can easily be eliminated. For this, use is made of a film or a masking layer 28, by screen printing or by paint spraying, arranged between the frame 2 and the smoothing film 8 so as to mask said frame 2 (which may be transparent), and, possibly, the edge of the adjustment film 9, and consequently all of the areas of air 27.

The aesthetic rendering resulting from this particular arrangement, illustrated by FIG. 3, has a first transparent area (on the left) corresponding to the superposition of the adjustment layer 9 and the of the smoothing film 8, and a second opaque area corresponding to the superposition of the masking layer 28 and of the smoothing film 8. The invention therefore makes it possible to observe two perfectly distinct areas, with no defects or discontinuities.

This solution should be compared to the reverse case, represented in FIGS. 4 and 5, which can appear when no attention is paid to the relative position of the top face of the adjustment layer 9 and of the frame 2.

Consequently, FIG. 4 shows an area of air 27, delimited above by the smoothing film 8, below by the adjustment layer 9 and on the side by the frame 2. This area of air 27 is therefore located on the adjustment layer (which is vertically above the touch sensor 1 and the display 13), where the aesthetically unpleasing effect or the optical disturbances can be visible, and it extends all the more over the adjustment layer 9 when the distance between the top faces respectively of the layer 9 and of the frame 2 is great.

It will be noted that a masking layer 28 can be used, this covering not only the frame 2 but also the edges of the layer 9, but this solution would not be satisfactory in the case where at least a part of the area of air 27 were to extend too far along the layer 9, it being understood that the masking layer 28 cannot mask too great a surface area of the touch interaction device for obvious reasons of optimization of the available surface area.

The aesthetic rendering and the compliance with optical performance levels resulting from this arrangement which can be produced with the human-machine interfaces according to the prior art, illustrated by FIG. 5, shows the same two areas as those represented in FIG. 3, but also an aesthetically unpleasing or blurred intermediate area 29, corresponding to the superposition of the adjustment layer 9, of the layer of air 27 and of the smoothing film 8, this area 29 being likely to extend randomly along the periphery of the adjustment layer 9 (and therefore of the touch interaction device or of the screen), which significantly detracts from the general aesthetic appearance and from the optical performance levels of the interface.

The invention claimed is:

1. A human-machine interface comprising a viewing device arranged facing a frame, wherein:
   a top face of the viewing device is arranged substantially above a top face of the frame and said device and said frame are covered by a smoothing film comprising a masking layer that covers the top face of the frame and only partly covers the top face of the viewing device, and
   a space is delimited by the frame, the masking layer, and an adustment layer covering the viewing device to remove blurring.

2. The interface as claimed in claim 1, wherein the viewing device is covered with an adjustment layer for adjusting the position of the top face of said device in relation to the top face of the frame.

3. The interface as claimed in claim 1, wherein the frame is covered with a masking layer.

4. The interface as claimed in claim 3, wherein the masking layer also covers at least a part of the top face of the viewing device.

5. The interface as claimed in claim 1, wherein the smoothing film comprises a masking layer.

6. The interface as claimed in claim 1, wherein the distance between the top face of the viewing device and the top face of the frame does not exceed the thickness of the smoothing film.

7. The interface as claimed in claim 1, wherein the distance between the top face of the viewing device and the top face of the frame is greater than a positioning tolerance of said faces relative to one another.

8. The interface as claimed in claim 1, wherein an edge of the viewing device, covered with an adjustment layer, is substantially in contact with an edge of the frame.

9. The interface as claimed in claim 1, wherein the viewing device is a screen or a display.

10. The interface as claimed in claim 1, wherein the viewing device is a touch interaction device.

11. The interface as claimed in claim 10, wherein the touch interaction device comprises a touch sensor which is at least partially transparent arranged above a display.

12. The interface as claimed in claim 10, wherein, the touch interaction device having at least a part facing a bottom face of the frame, said part is fixed to said bottom face of said frame.

13. The interface as claimed in claim 10, wherein, the interaction device being incorporated in a case, the case comprises in a top part a shoulder to support the frame.

* * * * *